//UNITED STATES PATENT OFFICE.

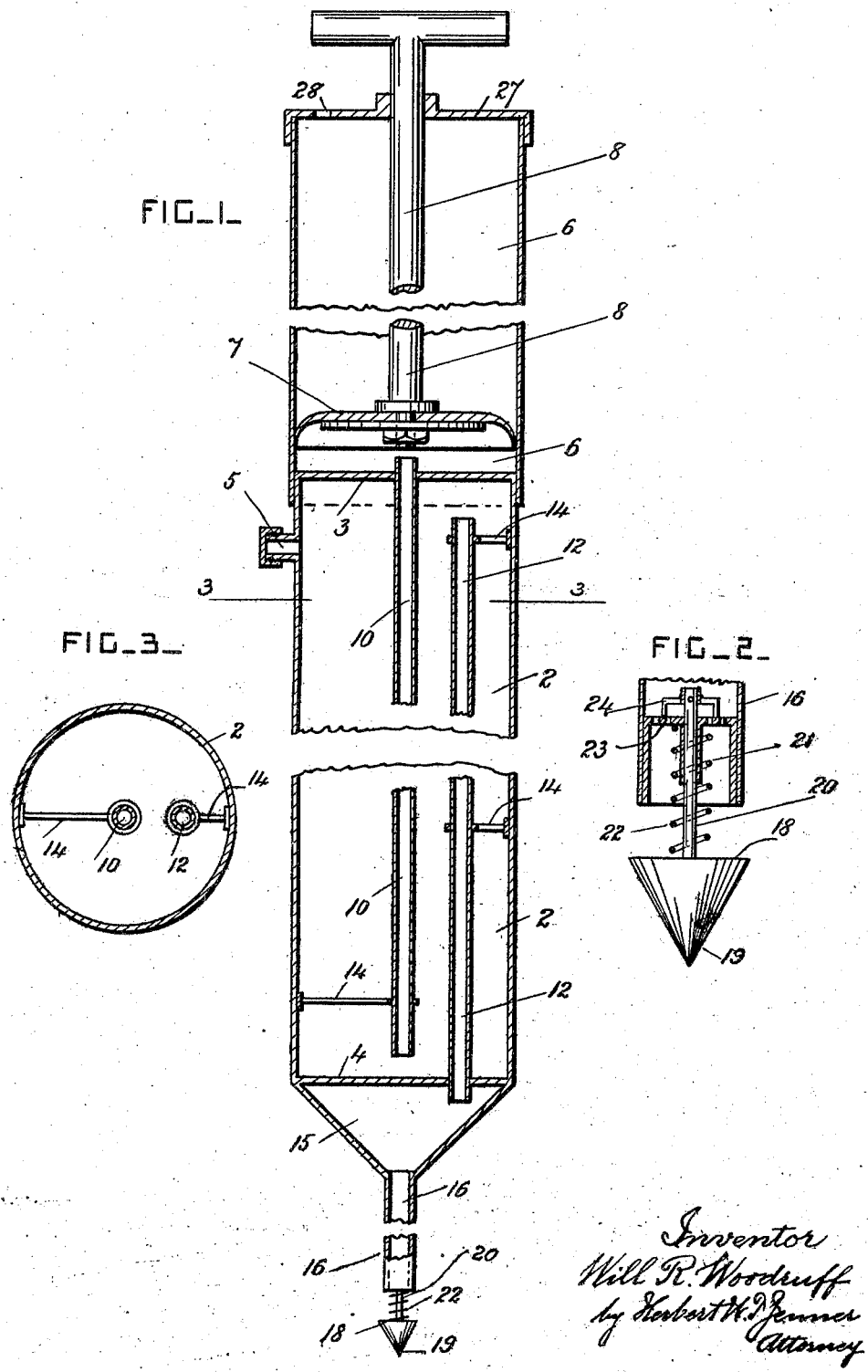

WILL RUSSEL WOODRUFF, OF STANTON, NEBRASKA.

VERMIN-EXTERMINATOR.

1,312,223.   Specification of Letters Patent.   Patented Aug. 5, 1919.

Application filed December 24, 1918. Serial No. 268,118.

*To all whom it may concern:*

Be it known that I, WILL R. WOODRUFF, a citizen of the United States, residing at Stanton, in the county of Stanton and State of Nebraska, have invented certain new and useful Improvements in Vermin-Exterminators, of which the following is a specification.

This invention relates to devices for destroying vermin, and more particularly burrowing animals, such as gophers; and it consists in the novel construction and combination of the parts hereinafter fully described and claimed which enables a poisonous gas to be forced into the burrows of the animals.

In the drawings, Figure 1 is a vertical section through a device constructed according to this invention. Fig. 2 is a section of the discharge valve, drawn to a larger scale. Fig. 3 is a cross-section, taken on the line 3—3 in Fig. 1.

A chamber 2 is provided and is preferably cylindrical and has ends 3 and 4. The poisonous volatile liquid to form the gas to kill the animals is placed in this chamber 2, together with absorbent material if desirable. The poisonous liquid is inserted through an opening 5 in the side of the chamber which opening is provided with any suitable stopper.

A pump cylinder 6 is secured to the upper end portion of the chamber 2, and it is preferably slipped over the top end 3, and is secured in any convenient way. A piston 7 is slidable in the cylinder 6, and is operated by hand by means of the piston-rod 8 which projects from the top of the cylinder.

An air inlet pipe 10 is secured in the top 3 of the chamber 2, and extends nearly to the bottom 4 thereof. The upper end of this pipe 10 is constantly in communication with the cylinder 6. A gas outlet pipe 12 is secured in the bottom 4 of the chamber 2, and projects below the bottom 4. Braces 14 are provided between these pipes and the sides of the chamber 2 at any desirable points.

A conical delivery chamber 15 is secured to the bottom end of the chamber 2, and a delivery pipe 16 projects from the smaller end of the chamber 15. This pipe 16 is provided with a delivery valve 18 at its bottom end, and this valve has a pointed portion 19 for penetrating loose soil or earth.

The valve 18 has a stem 20 which is slidable vertically in a guide 21 secured inside the pipe 16. The guide 21 is arranged inside the pipe 16, and is secured to it by a perforated plate 23. A spring 22 is provided between the valve and the plate 23, for opening the valve, and 24 is a stop on the stem which limits the opening of the valve. The valve overlaps the end of the delivery pipe, and when thrust into loose earth it prevents the delivery pipe from becoming blocked. The valve opens automatically when the pressure against it from below is relieved.

Air is forced through the chamber 2 by means of the piston, and carries the volatile poisonous gas from the chamber 2 down the delivery pipe into the burrows of the animals.

The piston in the air pump cylinder is preferably provided with a cup-shaped portion of flexible material which operates as an inlet valve, but the air pump may be constructed in any other approved manner and provided with any suitable air valves. The top plate 27 of the cylinder forms a guide for the piston-rod, and it has a hole 28 for the admission of air to the cylinder. A large volume of air is forced through the poison chamber at each stroke of the piston, so that the animals are exterminated before they have opportunity to escape.

What I claim is:

In a vermin exterminator, a chamber for volatile poison provided with means for forcing air through it and having a gas discharge pipe at its lower end, a guide arranged within the lower end portion of the discharge pipe and having a perforated plate which secures it to the said pipe, a conical plug which overlaps the end of the discharge pipe and which has a stem which is slidable in the said guide, and a spring arranged around the said guide and stem between the perforated plate and the base of the conical plug and permitting the plug to be pressed back to close the delivery pipe.

In testimony whereof I have affixed my signature.

WILL RUSSEL WOODRUFF.